Nov. 13, 1962 E. D. LINDEGREN Re. 25,287

MULTIPLE ORDER RECEIVING RECEPTACLE

Original Filed Aug. 31, 1959 3 Sheets-Sheet 1

INVENTOR
ERIK D. LINDEGREN

BY

Arthur H. Seidel

ATTORNEY

MULTIPLE ORDER RECEIVING RECEPTACLE

Original Filed Aug. 31, 1959 3 Sheets-Sheet 2

INVENTOR
ERIK D. LINDEGREN

BY

Arthur H. Seidel

ATTORNEY

Nov. 13, 1962 E. D. LINDEGREN Re. 25,287

MULTIPLE ORDER RECEIVING RECEPTACLE

Original Filed Aug. 31, 1959 3 Sheets-Sheet 3

INVENTOR
ERIK D. LINDEGREN

BY Arthur H. Siedel

ATTORNEY

United States Patent Office

Re. 25,287
Reissued Nov. 13, 1962

25,287

MULTIPLE ORDER RECEIVING RECEPTACLE

Erik D. Lindegren, 303 Dahl St., Rhinelander, Wis.

Original No. 3,000,416, dated Sept. 19, 1961, Ser. No. 837,050, Aug. 31, 1959. Application for reissue Mar. 12, 1962, Ser. No. 180,071
8 Claims. (Cl. 150—49)

Figure 1:
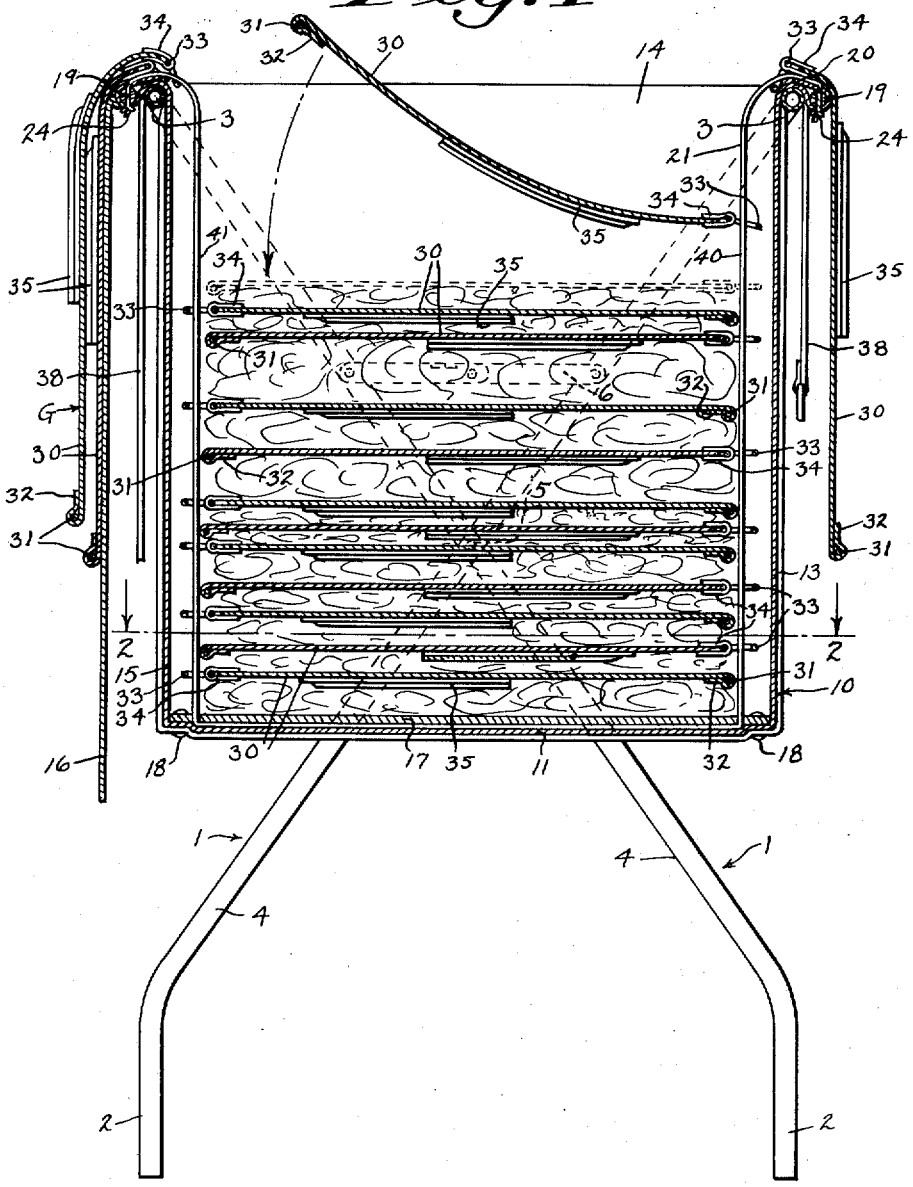

Matter enclosed in heavy brackets [ ] appears in the original patent but forms no part of this reissue specification; matter printed in italics indicates the additions made by reissue.

This invention relates to improvements in a bag or container for receiving, transporting and handling a plurality of bundles of garments, or other articles, to facilitate such operations as that of a laundry or dry cleaning establishment.

Primarily, the order receiving bag or receptacle herein disclosed is for use by receiving clerks in the plant office of a cleaning establishment, by routemen in pick-up trucks, and by agents and branches of the establishment.

Heretofore, the conventional manner of handling incoming orders has been to place each order in a separate cloth bag and this practice frequently required as few as one article, such as a tie, in an individual bag and then again the order might involve a large number of articles requiring more than one bag. These individual bags were placed in a canvas hamper and were later invoiced.

When, under this conventional manner the orders are invoiced, each bag must be shaken to remove the articles therein, usually on top of the other bags in the hamper. This is time consuming and frequently resulted in the loss of an item from one of the orders.

The principal object of this invention, therefore, is to provide an order receiving bag which will facilitate the disposal of each batch of garments delivered to receiving personnel with identifying information, such as the name and address of the customer and the subsequent itemizing or invoicing of the articles received by the invoicing clerk.

It is an object of this invention to provide a method of receiving, storing and subsequent invoicing of customer's orders for subsequent processing of cleaning operations.

More specifically it is an object to provide an order receiving bag which may be removably suspended, in open condition, from a portable frame and having movable divisional flaps sequentially placeable over succeeding orders and thereby dividing the bag area into separate compartments, each containing a single order and identifying the customer and address.

A further object is to provide a plurality of flaps in which each cooperates with adjacent flaps to close each compartment against accidental removal of garments in one compartment to an adjacent compartment.

Where an enterprise has a pick-up truck system and intercommunication radio equipment between the routemen and the plant office, the plant office, upon receiving a telephone call from a customer who has an order, may then radio the information to a routeman, giving him the name and address of the customer and upon receiving the order from the customer the routeman may then radio back to the plant office, giving the bag number and compartment number containing the customer's order, whereupon the plant office personnel may then place the information on the customer's order slip.

Figure 2:
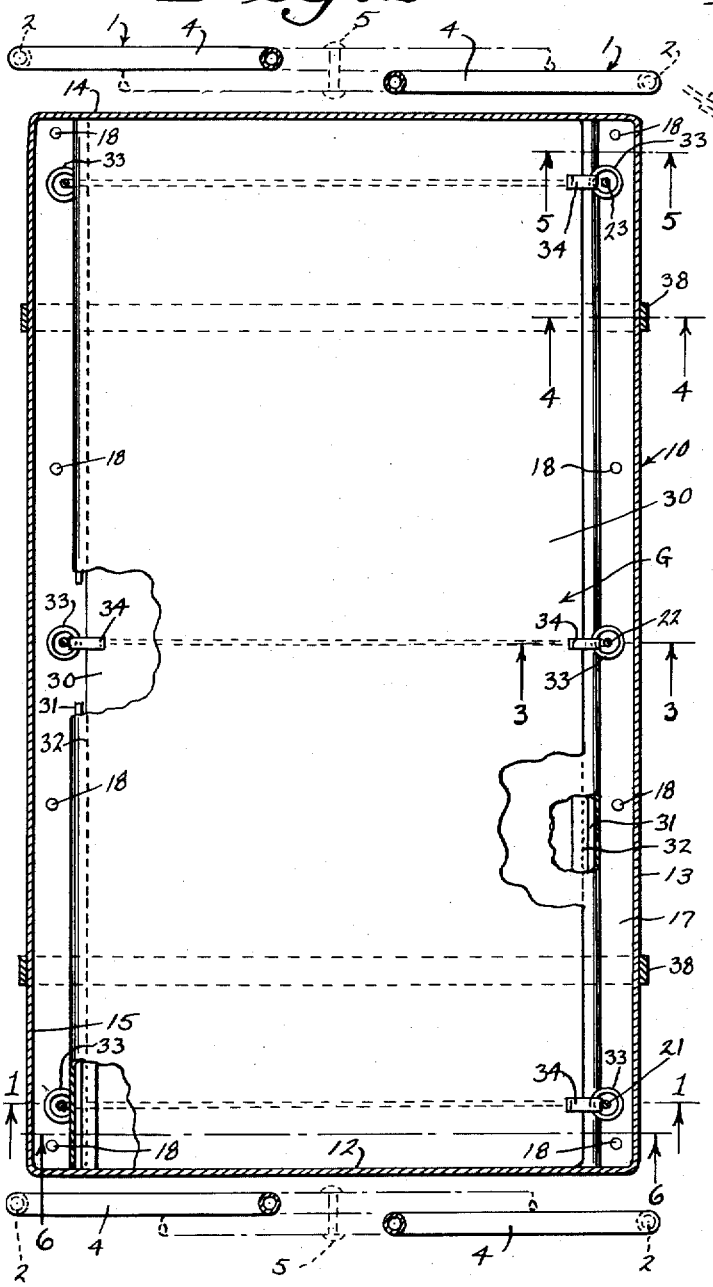
Figure 3:
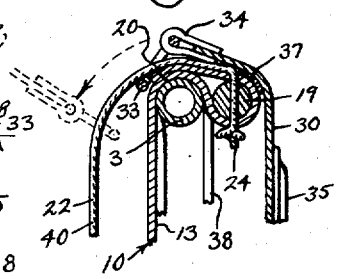
Figure 4:
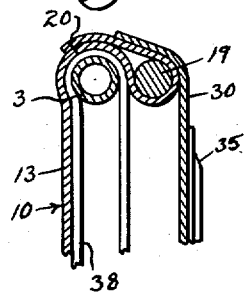
Figure 5:
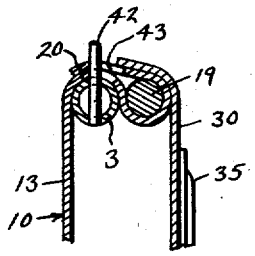
Figure 6:
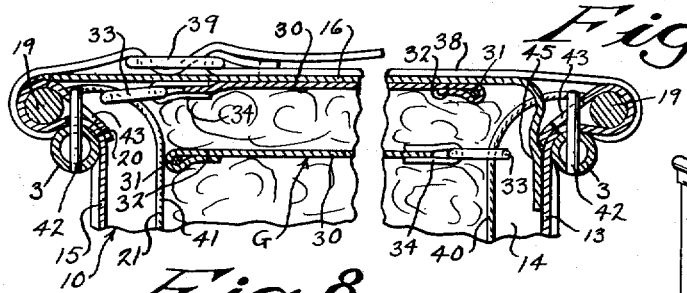
Figure 7:
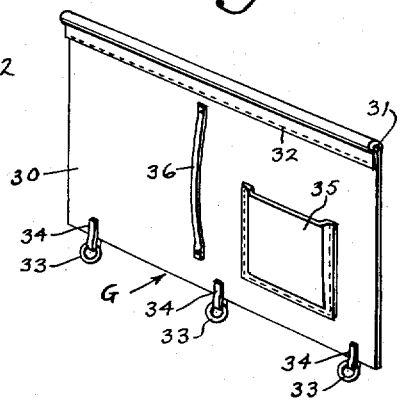
Figure 8:
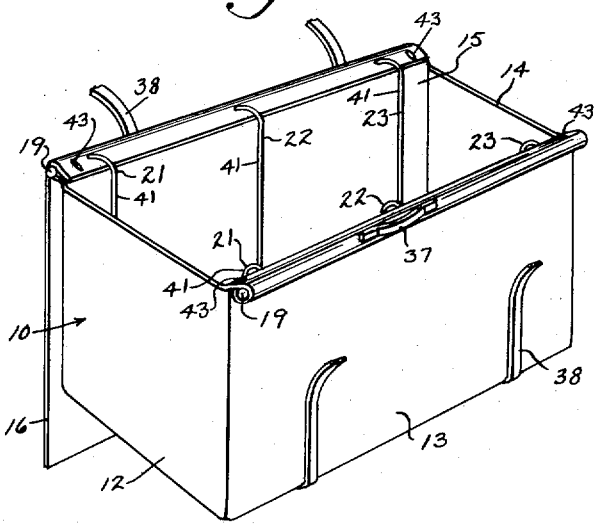
Figure 9:
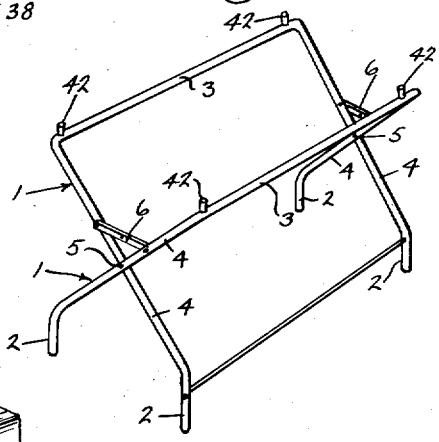
Figure 10:
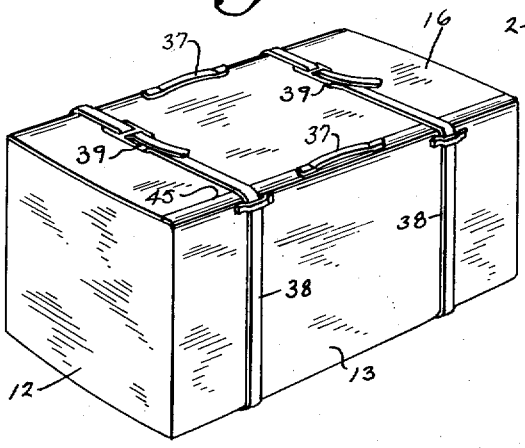

Other objects and advantages will be evident as the following description of the drawings progresses, in which:

FIG. 1 is a vertical sectional view taken on the line 1—1 relative to FIG. 2,

FIG. 2 is a horizontal sectional view taken on the line 2—2 relative to FIG. 1, parts being broken away to disclose certain details, FIG. 3 is an enlarged fragmentary sectional view taken on the line 3—3 relative to FIG. 2, FIG. 4 is a view similar to FIG. 3 taken on a line 4—4 relative to FIG. 2, FIG. 5 is a view similar to FIGS. 3 and 4 taken on a line 5—5 relative to FIG. 2, FIG. 6 is an enlarged fragmentary sectional view of the upper portion of FIG. 1 taken on the line 6—6 relative to FIG. 2, FIG. 7 is a reduced perspective view of one of the bag division flaps, FIG. 8 is a reduced perspective view of the bag removed from the rack, FIG. 9 is a reduced perspective view of the rack, and FIG. 10 is a reduced perspective view of the bag as it appears when closed.

The stand or rack, which is similar to a sawbuck or sawhorse, comprises two substantially identical cross pipes 1 (see FIG. 9) each bent to form foot portions 2 and a horizontal portion 3 connected to the foot portions 2 by the diagonally extending portions 4. Adjacent portions 4 of the respective cross pipes are pivotally connected at 5 and a jointed tie bar 6 connects each of the adjacent portions 4 above the pivot points 5 permitting the rack to be collapsed when not in use.

The bag, bale or container comprises a receptacle 10 of canvas or similar material having a bottom 11, side walls 12, 13, 14 and 15 and a cover 16. A base board 17 covers the bottom 11 and is riveted thereto at 18 to provide rigidity to the bottom. The upper margin of each side 13 and 15 embraces a rod-like member 19 and is secured at at 20. In the embodiment shown, three relatively spaced cords 21, 22 and 23 of any suitable material extend from the rod 19 on one side of the container downwardly inside the bag or bale, through the board 17 and bottom 11 then across the bottom to the opposite side of the bag, upwardly through the bottom 11 and board 17 and interior of the bag to the other rod 19 on the opposite side. Each end of the cord is suitably anchored to the adjacent rod as by passing it through an aperture and knotting at 24 (see FIG. 3).

A plurality of flexible curtains or compartment covers designated generally by the letter G (see FIG. 7), each comprises a rectangular sheet 30 provided on one margin with a rod 31 embraced by the material and secured thereby at 32. The opposite margin of the sheet 30 is provided with relatively spaced rings 33 secured thereto by loops 34. A pocket 35 is provided for receiving an identification slip identifying the materials covered by the sheet as will be subsequently noted. For convenience in placing the sheet over the material, a strip-like handle 36 may be provided as will more specifically be noted hereafter. Secured to each of the rods 19, is a strap-like handle 37 to facilitate removal of the bag from the rack when filled. A pair of relatively spaced straps 38 are secured to and extend around the bag to be buckled, as at 39. (See FIGS. 6 and 10.)

As clearly indicated in FIG. 1, the sheets 30 are arranged in sets of a plurality of sheets, one set being mounted with the rings 33 of each sheet slidably embracing the upwardly extending cord portions 40 on one side of the container or bag and the other set being mounted with the ring 33 of each sheet slidably embracing the upwardly extending cord portions 41 on the opposite side of the container. Thus, when the sheets 30 are moved out of the container, one set will hang over the upper margin of the side 13 and the other set of sheets 30 will hang over the upper margin of the side 15.

When the container is mounted in the rack the upper margin of each side 13 and 15 will extend over the adjacent horizontal portions [2] *3* of the rack with the rods 19 hanging downwardly outside of the walls. Preferably, each of the horizontal portions [2] *3* of the rack is provided at each end with a pin 42 (see FIG. 6) which extends upwardly through apertures 43 in the sides and to a position laterally of the adjacent rods 19 thereby insuring that the container will remain in place in the rack while being filled. As previously noted, the sets of sheets will hang over the horizontal portions [2] *3* of the rack and the rods 19 on the container ready to be moved into the container alternately from each set as orders are sequentially placed in the container.

The first order will be placed on the bottom of the container, an identifying slip inserting in the pocket 35 of that sheet and the sheet moved in to cover the order. The rod 31 of that sheet will be positioned so that it will be adjacent the upright portion of the cord 21, the upright portion being 40 in FIG. 1. This process of placing orders in the container will be continued until it is filled, the sheets 30 being alternately moved into the container as each order is placed therein. The primary function of the rods 31 on the sheets is to seal each compartment against movement of articles in one compartment to another.

When the container has ben filled, the cover 16 will then be moved over the top and preferably tucked in as indicated at 45 in FIG. 6. The straps 38 will then be secured as in FIG. 10, and the container or bale removed from the rack by means of the handles 37. For more convenience in manually transporting the bale, the straps 38 may be utilized.

The usual procedure in filling the container at the plant office is for the receiving clerk to place in the pocket 35 of each sheet 30, a slip identifying the name and address of the customer whose materials are covered by one of the sheets. Then later the invoice clerk will enter on the slip the name of each article, color, etc. of the order identified by the slip. In practice each container or bale will be identified by a number and each sheet in the bale will also have an order number. Thus, the first order in bale No. 1 will be identified by the bale number and order number 1.

When the establishment maintains a pick-up service, operated by a radio inter-communication system, the plant office will radio to one of the routemen the name and address of a customer requesting pick-up service. When the routeman has made the requested pick-up, he will then radio to the plant office the bale number and order number identifying the customer's material.

From the foregoing it will be apparent that I have provided a novel order receiving bag which facilitates the service to customers requesting the entry of orders and the subsequent entry of detailed information properly identifying each of the articles with a customer's order.

I claim:

1. In a receptacle for receiving a plurality of individual groups of articles, a bag of rectangular configuration in transverse cross-section, said bag having a substantially rigid bottom and four relatively flexible side walls, a pair of rigid rod-like members one disposed at and secured to the upper margin of a side wall and the other disposed at and secured to the upper margin of an opposite side wall, a plurality of cord-like guides in relatively spaced relation adjacent each of said opposite side walls, each of said guides being secured to one of said rod-like members and extending downwardly to said bottom and secured thereto and further extending upwardly to the other of said rod-like members and secured thereto, a plurality of flexible sheets arranged in two groups, the sheets of one group being slidably mounted at one margin on the guides adjacent one of said opposite sides and the sheets of the other group being slidably mounted at one margin on the guides adjacent the other of said opposite sides, said sheets each being movable into and out of said bag and over the rod-like member at the side corresponding to the guides on which such sheets are slidable, whereby one group will hang over one of said members and the other group will hang over the other of said members, and a flexible sheet-like cover secured to one of said members for movement over the top of said bag subsequent to movement of said sheets into said bag.

2. In a receptacle for receiving a plurality of individual groups of articles, a bag of rectangular configuration in transverse cross-section, said bag having a substantially rigid bottom and four relatively flexible side walls, a pair of rigid rod-like members one disposed at and secured to the upper margin of a side wall and the other disposed at and secured to the upper margin of an opposite side wall, a plurality of cord-like guides in relatively spaced relation adjacent each of said opposite side walls, said guides being secured to one of said members and extending downwardly to said bottom and secured thereto and further extending upwardly to the other of said members and secured thereto, a plurality of flexible sheets arranged in a pair of groups, the sheets of one group being slidably mounted at one margin on the guides adjacent one of said opposite sides and the sheets of the other group being slidably mounted at one margin on the guides adjacent the other of said opposite sides, said sheets each being movable into and out of said bag and over the rod-like member at the side corresponding to the guides on which such sheets are slidable, whereby one group will hang over one of said members and the other group will hang over the other of said members, and a flexible sheet-like cover secured to one of said members for movement over the top of said bag subsequent to movement of said sheets into said bag, said rod-like members each having a handle intermediate its ends exposed for manual engagement when said cover is closed.

3. In a receptacle for receiving a plurality of individual groups of articles, a bag of rectangular configuration in transverse cross-section, said bag having a substantially rigid bottom and four relatively flexible side walls, a pair of rigid rod-like members one disposed at and secured to the upper margin of a side wall and the other disposed at and secured to the upper margin of an opposite side wall, a plurality of cord-like guides in relatively spaced relation adjacent each of said opposite side walls, each of said guides extending from one of said rod-like members and being secured to said bottom and further extending upwardly to the other of said rod-like members and secured thereto, a plurality of flexible sheets arranged in a pair of groups, the sheets of one group being slidably mounted at one margin on the guides adjacent one of said opposite sides and the sheets of the other group being slidably mounted at one margin on the guides adjacent the other of said opposite sides, said sheets each being movable into and out of said bag and over the rod-like member at the side corresponding to the guides on which such sheets are slidable, whereby one group will hang over one of said members and the other group will hang over the other of said members, and a flexible sheet-like cover secured to one of said members for movement over the top of said bag subsequent to movement of said sheets into said bag, said rod-like members each having a handle intermediate its ends exposed for manual engagement when said cover is closed, and at least two relatively spaced binding straps encircling said bag when closed.

4. A receptacle comprising a bag having a substantially rectangular bottom and four substantially rectangular sides in combination with a substantially rigid base board secured to and covering said bottom, a pair of substantially rigid rod-like members one disposed at the upper margin and embraced by a side wall and the other disposed at the upper margin and embraced by an opposite side wall, a plurality of relatively spaced guide cords, each secured to one of said members and extending therefrom downwardly adjacent the corresponding side wall and through the base board and bottom thence along said bottom to the opposite side and upwardly through the bottom and to the other of said members, said cords being secured to said other member, a plurality of sheets in said bag arranged in a pair of groups, one margin of the sheets of one group being individually slidably connected to said cords adjacent one side of said bag and one margin of the sheets of the other group being individually slidably connected to said cords adjacent the opposite side of said bag, a rod-like bar secured to each sheet at the margin most remote from said one margin, whereby the sheets may be disposed in said bag alternatively from each group to provide a plurality of compartments in said bag, said sheets each having a pocket for receiving an identification slip, and a sheet-like cover having one margin secured to one of said rod-like members and extending across said bag to the other of said rod-like members.

5. The receptacle as defined in claim 1 in combination with a rack having a pair of relatively spaced horizontal bars, and means on said bars operating against said rod-like members for releasably securing each of said upper margins of said side walls to an adjacent bar.

6. The bag as defined in claim 1 in combination with a rack having a pair of relatively spaced horizontal bars, the upper margin of each of said opposite sides extending over an adjacent bar on said rack and each of the rod-like members paralleling an adjacent bar and disposed on a side thereof most remote from the other of said bars, and a pair of relatively spaced pins on each of said bars extending through an adjacent margin of a side of said bag, each of said pins disposed for engagement with the inner side of an adjacent rod-like member.

7. In a receptacle for receiving a plurality of individual groups of articles, the combination comprising: a bag having a bottom and oppositely disposed side walls; a pair of rigid rod-like members, one of the rod-like members being disposed along and secured to the upper margin of one side wall and the other of the rod-like members being disposed along and secured to the upper margin of an opposite side wall; two sets of cord-like guides, the guides of one set being secured at one end to one of the rod-like members and extending downwardly adjacent the corresponding side wall to be secured at the bottom of the receptacle and the guides of the other set being secured at one end to the other of the rod-like members and extending downwardly adjacent the corresponding side wall to be secured at the bottom of the receptacle; and a plurality of flexible sheets arranged in two groups, the sheets of one group each being slidably mounted at one margin on one of the sets of guides and the sheets of the other group each being slidably mounted at one margin on the other of the sets of guides, said sheets each being movable along the respective guides into and out of said bag and over the corresponding rod-like member, whereby one group of sheets will hang over one of the rod-like members and the other group will hang over the other rod-like member.

*8. In a receptacle for receiving a plurality of individual groups of articles, the combination comprising: a bag having a bottom and a side wall; a rod-like member disposed along and secured to the upper margin of the side wall; cord-like guide means secured at one end to the rod-like member and extending downwardly along the inner surface of the side wall and secured at its other end at the bottom of the bag; and a plurality of flexible sheets each slidably mounted at one margin on the guide means, each of said sheets being movable along the guide means into the bag and out of the bag to hang over the rod-like member.*

References Cited in the file of this patent or the original patent

UNITED STATES PATENTS

| | | |
|---|---|---|
| 1,597,640 | Vordemfelde | Aug. 24, 1926 |
| 2,378,606 | Watson | June 19, 1945 |
| 2,440,192 | Cowan | Apr. 20, 1948 |
| 2,543,243 | Kliewer | Feb. 27, 1951 |
| 2,544,074 | Ernst et al. | Mar. 6, 1951 |
| 2,600,439 | Sloane | June 17, 1952 |
| 2,897,863 | Sommers | Aug. 4, 1959 |